United States Patent
Naveen et al.

[19]

[11] Patent Number: 5,995,151
[45] Date of Patent: Nov. 30, 1999

[54] BIT RATE CONTROL MECHANISM FOR DIGITAL IMAGE AND VIDEO DATA COMPRESSION

[75] Inventors: Thumpudi Naveen; Ali Tabatabai, both of Beaverton, Oreg.; Robert O. Eifrig, San Diego, Calif.

[73] Assignee: Tektronix, Inc., Wilsonville, Oreg.

[21] Appl. No.: 08/932,681

[22] Filed: Sep. 18, 1997

Related U.S. Application Data

[63] Continuation-in-part of application No. 08/566,100, Dec. 4, 1995, Pat. No. 5,686,964.
[51] Int. Cl.$^6$ ...................................................... H04N 7/12
[52] U.S. Cl. .......................... 348/420; 348/394; 348/405; 348/415; 348/419
[58] Field of Search ..................................... 348/420, 394, 348/405, 415, 419; 382/239, 243; H04N 7/12

[56] References Cited

U.S. PATENT DOCUMENTS 5,686,964  11/1997  Tabatabai ................................. 348/420

*Primary Examiner*—Howard Britton
*Attorney, Agent, or Firm*—Francis I. Gray

[57] ABSTRACT

A bit rate control mechanism for a digital image or video compression system estimates a complexity parameter for a current picture, or block of samples, of a video signal as a function of parameters for a prior picture of the video signal, which parameters include a bit rate. From the complexity parameter a quality factor for the current picture is determined and applied to a quantizer to compress the current picture. A complexity pre-processor may also be used to detect scene changes in the video signal prior to estimating the complexity parameter. If there is a scene change detected, then the rate control mechanism is reset prior to estimating the complexity parameter for the first picture in the new scene. Also a video buffer verifier is controlled so that the buffer occupancy at the end of a specified image sequence is at a target value so that looping and editing applications are facilitated.

5 Claims, 6 Drawing Sheets

ADAPTIVE STILL IMAGE TRANSFORM CODER

MOTION PICTURE TRANSFORM CODER (JPEG)

FIG. 3 (PRIOR ART) MPEG TRANSFORM CODER

OVERLAPPING WINDOWS

NON-OVERLAPPING WINDOWS

COMPLEXITY PRE-PROCESSOR

BIT RATE CONTROL MECHANISM FOR DIGITAL IMAGE AND VIDEO DATA COMPRESSION

CROSS-REFERENCE TO RELATED APPLICATIONS

This application is a continuation-in-part of U.S. patent application Ser. No. 08/566,100 filed Dec. 4, 1995, now U.S. Pat. No. 5,686,964.

STATEMENT REGARDING FEDERALLY SPONSORED RESEARCH OR DEVELOPMENT

Not applicable.

BACKGROUND OF THE INVENTION

The present invention relates to data compression, and more particularly to a bit rate control mechanism for digital image and video data compression that estimates the number of bits required to represent a digital image or a video at a particular quality in compressed form or alternatively estimates the quality achievable for a digital image or a video when compressed to a given number of bits, which estimates are used to control the number of bits generated by a video compression system.

Visual information may be represented by digital pictures using a finite amount of digital data for still images, and by a finite data rate for time-varying images. Such data in its uncompressed form contains a considerable amount of superfluous information. Image compression techniques attempt to reduce the superfluous information by minimizing the statistical and subjective redundancies present in digital pictures. Pulse code modulation, predictive coding, transform coding, interpolative/extrapolative coding and motion compensation are some of the tools used in image compression techniques.

A digital video/image compression technique may be either lossy or lossless. The lossy compression techniques introduce an irreversible amount of distortion into the picture data. In these techniques a trade-off is made between the amount of distortion added to the original picture input and the number of bits the compressed picture occupies. A rate controller in a video/image compression system controls the number of bits generated by altering the amount of distortion added to the original input by the compression system. In other words a rate controller in a video/image encoder controls the number of bits needed to represent the compressed image by changing the quality of the decompressed image.

Transform coding techniques take a block of samples as the input, transform this block into a number of transform coefficients, quantize the transform coefficients, and variable or fixed length encode the quantized transform coefficients. The input to the transform coding system may be either the original picture elements (pixels), such as in JPEG and intra-MPEG, or the temporal differential pixels, such as in inter-MPEG. An adaptive still image coding technique using a transform coder with a rate controller is shown in FIG. 1. An input image block is transformed by a discrete cosine transform (DCT) function, quantized and variable length coded (VLC). The rate controller observes $R(n-1)$, the number of bits generated by the previous block, and selects a quantizer scale factor $Q(n)$ for the current block. A still image coding scheme, such as JPEG, may be used on a motion picture, as shown in the simplified block diagram of FIG. 2. In these schemes the rate controller observes $R(n-1)$, the number of bits generated by the previous frame (field), and selects a quantizer scale factor $Q(n)$ for the current frame (field). A simplified block diagram of an MPEG encoder is shown in FIG. 3, where $R(n-1)$ is the typical number of bits generated in the previous macroblock. For JPEG $Q(n)$ is referred to as a factor or quality factor, and for MPEG it is referred to as mquant.

In all of the schemes shown in FIGS. 1–3 $Q(n)$ is used to scale the step sizes of the quantizers of transform coefficients (quantizer matrices). Increasing $Q(n)$ reduces $R(n)$ and vice versa. $Q(n)$ is selected so that $R(n)$, the number of bits generated with this quantizer scale factor $Q(n)$, is close to the targeted rate for the block, frame or field. $Q(n)$ also is an indication of the quality of the decoded block, frame or field. To perform efficiently, a rate control algorithm requires a good estimate of the rate-quality relationships for the input data, i.e., $R(n)$ vs. $Q(n)$. A good rate controller would come up with a $Q(n)$ that results in a targeted $R(n)$. The targeted $R(n)$ for a block, frame or field could vary with n. For example it might take into account the visual characteristic of the block in question, whether the coding is variable bit rate (VBR) or constant bit rate (CBR). A good rate controller tries to keep the $Q(n)$ smooth over n so that the resulting quality of the decoded picture is smooth as well.

Given actual $R(n-1)$, the actual bits generated for the preceding block number n-1, Chen et al, as described in "Scene Adaptive Coder" from *IEEE Trans. Communications* March 1984, compute $Q(n)$ in the following manner. A buffer status $B(n-1)$ after coding block n-1 is recursively computed using $$B(n-1)=B(n-2)+R(n-1)-R$$

where R is the average coding rate in bits per block. From the buffer status $B(n-1)$ the quality factor $Q(n)$ is computed through $$Q(n)=(1-\gamma)*\phi(B(n-1)/B)+\gamma*Q(n-1)$$

where $\phi\{\ \}$ is an empirically determined normalization factor versus buffer status curve and B is the rate buffer size in bits. This produces a smoothly varying $Q(n)$ depending on $\gamma$. $\gamma$ is taken to be less than unity.

Alternatively the Test Model Editing Committee, International Organization for Standardization, *Test Model* 3 (Draft), December 1992 computes $Q(n)$ in a similar way as follows. First the virtual buffer status $B(n-1)$ is computed as above. Then $Q(n)$ is computed through the linear relation $$Q(n)=K_R*B(n-1)$$

where $K_R$ is a constant that depends on the targeted average bit rate. This $Q(n)$ may be further scaled based on the visual complexity of the block being coded.

Using these techniques $Q(n)$ could change rapidly, and there is no estimate of the quality achievable for a particular block, frame or field with a given number of bits. What is desired is a rate control mechanism that estimates the quality achievable for a digital image or video when compressed to a given number of bits or alternatively estimates the number of bits required to represent a digital image or video at a particular quality in a compressed form.

BRIEF SUMMARY OF THE INVENTION

Accordingly the present invention provides a bit rate control mechanism for video data compression that either estimates the number of bits required to represent a digital image or video at a particular quality in a compressed form or estimates the quality achievable for a digital image or video when compressed to a given number of bits. A quantizer for compressing the transform coefficients for a current block of samples of a video signal is controlled by a quality factor that is a function of a bit rate for a prior block of samples of the video signal as determined by a rate controller. In the rate controller a complexity parameter is determined as a function of the prior block of samples including the bit rate. The complexity parameter is then used together with the bit rate to generate the quality factor. The rate controller may also include a scene detector for resetting the rate controller at the beginning of each scene.

The objects, advantages and novel features of the present invention are apparent from the following detailed description when read in light of the appended claims and attached drawing.

DETAILED DESCRIPTION OF THE INVENTION

The relationship between the quality factor Q of a compressed video and the average bits R generated by a block, frame or field of samples is modeled through $$R = \alpha * Q^{-\beta}, Q>0, \alpha \geq 0, \beta > 0$$

where $\alpha$ gives an indication of the complexity of the block being compressed, which may vary from block to block (frame/field to frame/field), and $\beta$, which empirically has significantly less variations, may be treated as a constant. This model is applicable to a number of image and video compression techniques, including JPEG, MPEG and MPEG-2. The quality factor Q may be used to generate the qfactor in JPEG or mquant in MPEG through simple scale and saturation operations.

If $\alpha$ and $\beta$ for block n equal $\alpha(n)$ and $\beta(n)$ respectively, the targeted bits R(n) for block n may be achieved by using a quality factor Q(n) given by $$Q(n) = (R(n)/\alpha(n))^{-1/\beta(n)}.$$

In general $\alpha(n)$ and $\beta(n)$ are not known in advance, but $\beta(n)$ may be assumed to be a constant $\beta$. Then the quality factor is given by $$Q(n) = (R(n)/\alpha(n))^{-1/\beta}.$$

Figure 1:
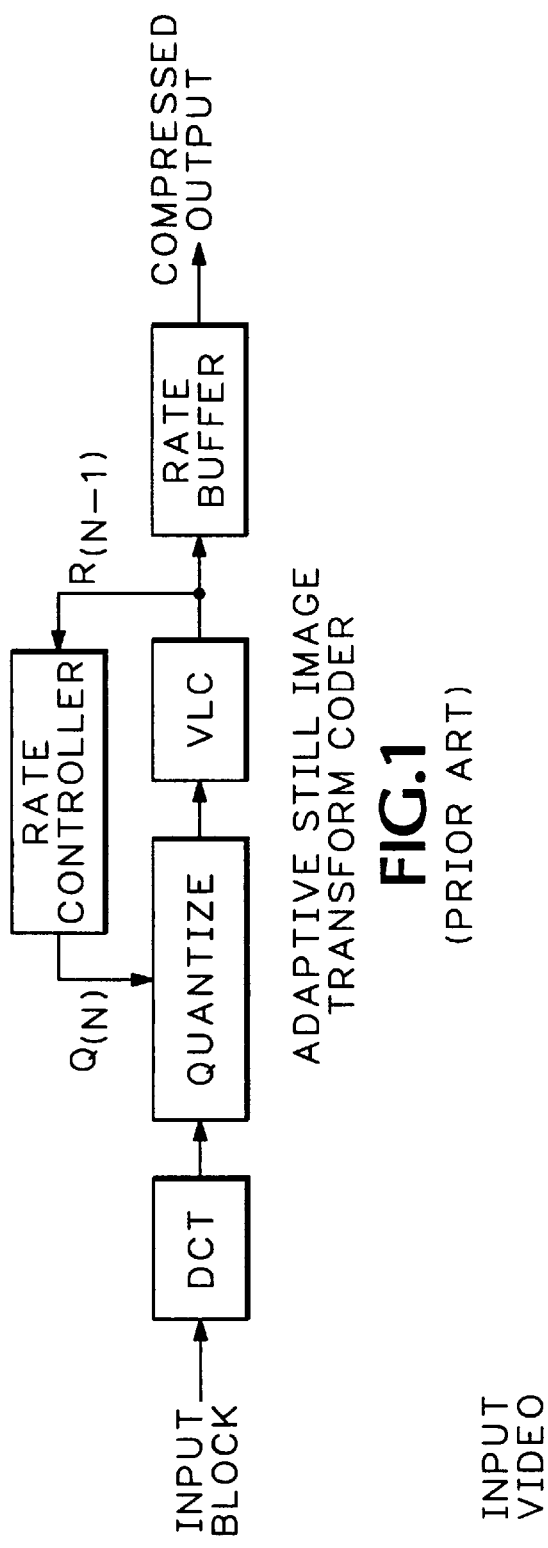
FIG. 1 is a block diagrammatic view of an adaptive still image coding technique with a bit rate controller according to the prior art.
Figure 2:
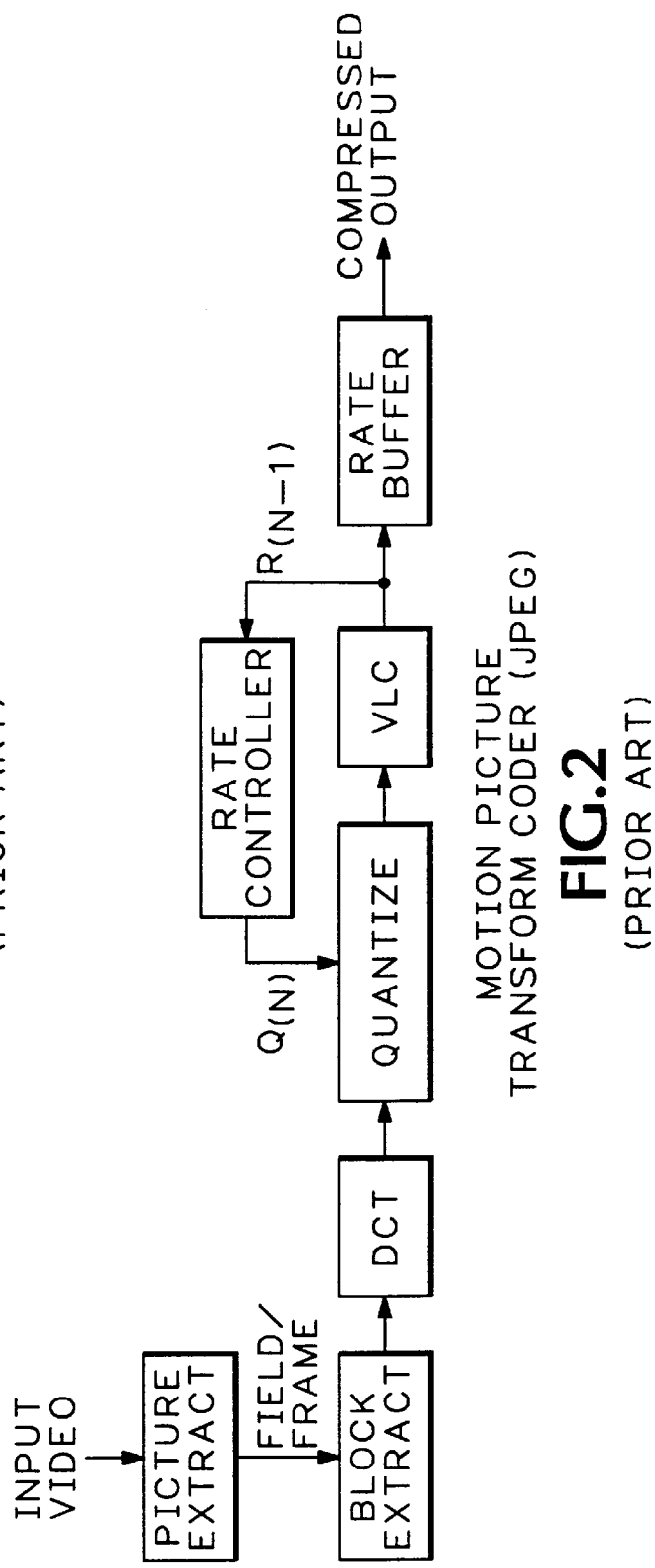
FIG. 2 is a block diagrammatic view of a motion JPEG scheme with bit rate control according to the prior art.
Figure 3:
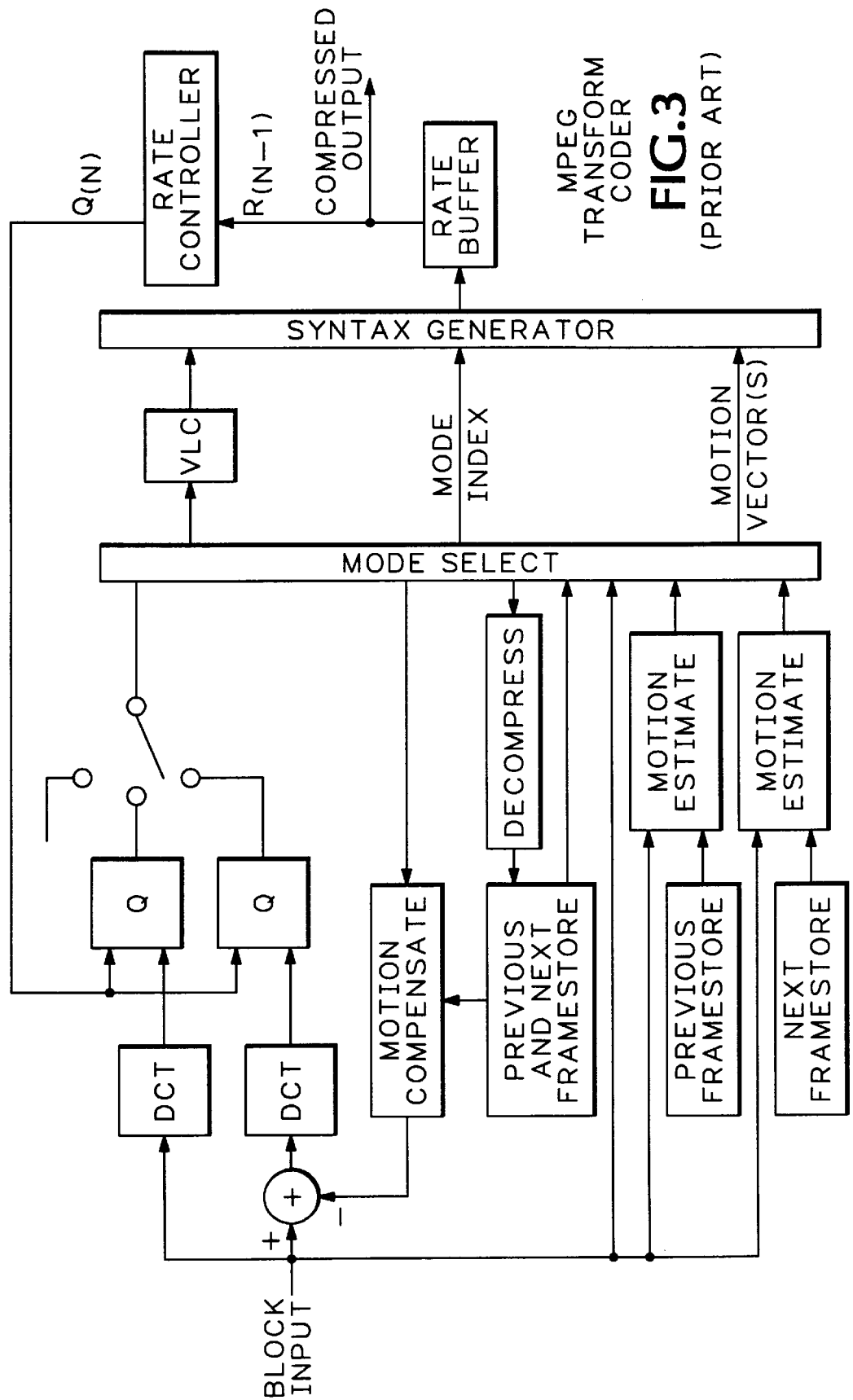
FIG. 3 is a block diagrammatic view of an MPEG encoder with bit rate control according to the prior art.
Figure 4:
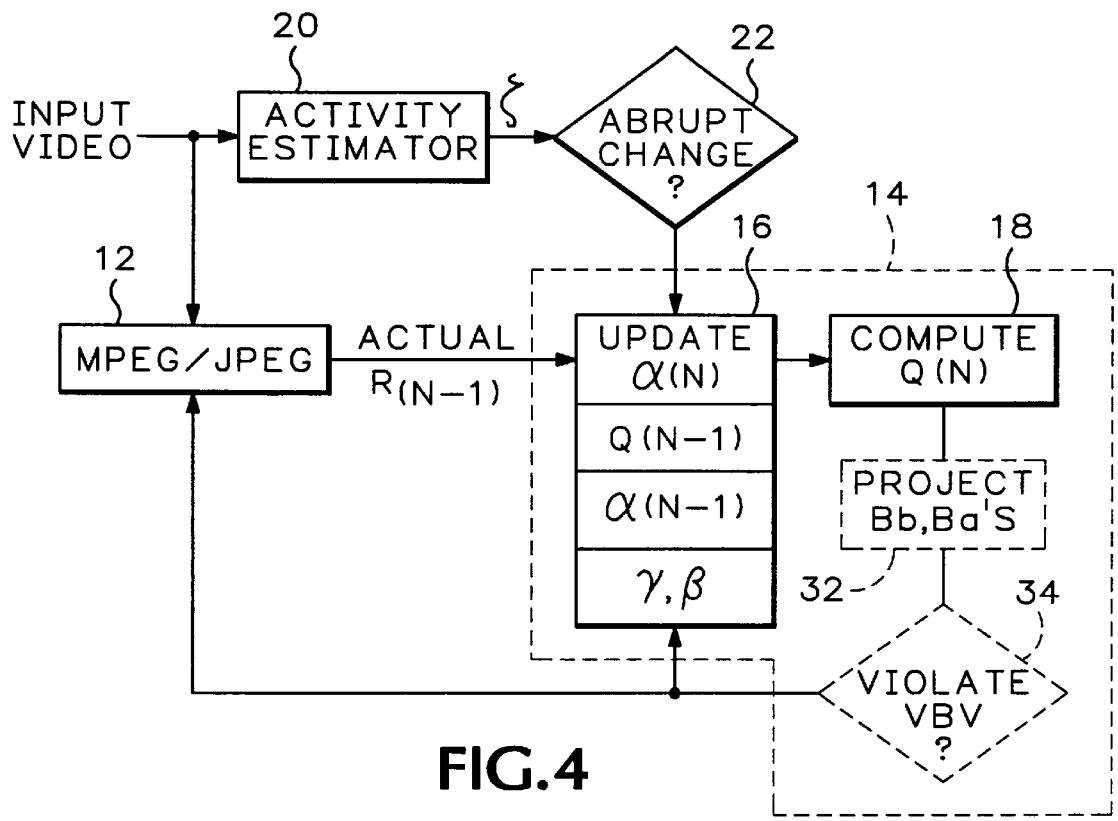
FIG. 4 is a block diagram view of a bit rate controller according to the present invention.

In motion JPEG and all-I MPEG coding schemes all the pictures in the video are compressed the same way, and only one complexity metric needs to be maintained. An input video signal is input to an MPEG or motion JPEG encoder 12 as shown in FIG. 4 to obtain an actual R(n−1) for the prior frame. The actual R(n−1) is input to a processor 14. The processor 14 has a complexity processor 16 which uses the previous history to estimate $\alpha(n)$:

$$\alpha(n) = (1-\gamma)*R(n-1)*Q(n-1)^{\beta} + \gamma*\alpha(n-1)$$

where $\gamma$ is the smoothing factor in the estimation of $\alpha$, R(n−1) is the actual number of bits used for picture n−1. Depending upon the application, a value for $\gamma$ is selected from the range $0 \leq \gamma \leq 1$. If $\gamma=1$, $\alpha(n)$ is a constant with respect to n, and if $\gamma=0$, $\alpha(n)$ depends only on the preceding block coding results. Once $\alpha(n)$ is estimated, then it is input to a quality processor 18 where the quality factor Q(n) may be computed as above. In MPEG the average rate R is used to obtain Q(n), as well as the targeted R(n) for a particular picture. Q(n) is used to obtain results in actual R(n), which is used for updating $\alpha(n)$. In motion JPEG, as well as in all-I MPEG, targeted R(n) is usually the same for every picture, i.e., equal to the average required rate R. This R is used to obtain Q(n), which is used to obtain actual R(n) for updating $\alpha(n)$.

In a more general compression of video using MPEG the coded pictures may be categorized into three types: I, B and P. An Intra-coded (I) picture is coded using information only from itself. A Predictive-coded (P) picture is coded using motion compensated prediction from a past reference frame or past reference field. A Bidirectionally-coded (B) picture is coded using motion compensated prediction from a past and/or future reference frame(s). A given picture (field/frame) of video has a different coding complexity depending upon whether it is coded as an I, B or P picture. Therefore three picture complexity measures are used for the video, $\alpha_I$, $\alpha_B$ and $\alpha_P$ for I, B and P pictures respectively. Upon compressing the picture n−1 with a quality factor Q(n−1), the actual output bits R(n−1) are measured. Then depending upon the coded picture type t(n−1) the corresponding picture complexity is updated:

$$\alpha_{t(n-1)}(n) = (1-\gamma)*R(n-1)*Q^{\beta}(n-1) + \gamma*\alpha_{t(n-1)}(n-1)$$

The other two picture complexities remain unchanged:

$$\alpha_s(n) = \alpha_s(n-1), s \in \{I,B,P\} \setminus t(n-1)$$

Then the target number of bits R(n) and the quality factor Q(n) for the current picture n may be computed through one of two methods: overlapping window method and non-overlapping window method. In both methods, as usually done in the MPEG world, the assumptions are:

$$Q_B = K_B * Q_I$$

$$Q_P = K_P * Q_I$$

where $K_B$ and $K_P$ are known constants, and $Q_I$, $Q_B$ and $Q_P$ are the quality factors used for I, B and P pictures respectively.

Figure 5:
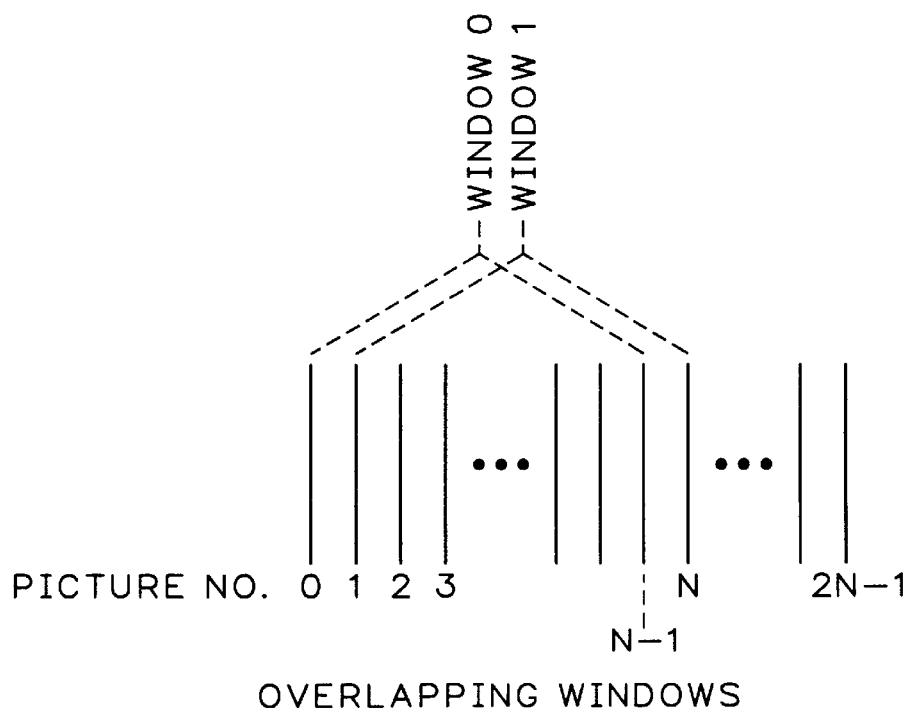
FIG. 5 is an illustrative view of picture grouping for an overlapping window method of determining quality and targeted number of bits according to the present invention.

In the overlapping window method, also known as the sliding window method, the stream of pictures (fields/frames) to be compressed, in coding order as opposed to the display order, are blocked into overlapping windows of size N as shown in FIG. 5. In this method pictures 0 through N−1 form the first window (WINDOW 0), pictures 1 through N form the second window (WINDOW 1), etc. After compressing each picture, the window is moved to the right by one picture. If $N_I$, $N_B$ and $N_P$ represent the number of I, B and P pictures remaining in the current window, then for the overlapping window method $$N_I + N_B + N_P = N$$

$$E(n) \triangleq \text{TargetedR}(n) - \text{ActualR}(n)$$

$$E(-1) = 0$$

$$Q_I(n) = ((\alpha_I N_I + \alpha_B N_B K_B^{-\beta} + \alpha_P N_P K_P^{-\beta})/((N_I + N_B + N_P) * R + E(n-1)))^{1/\beta}$$

where R is the average coding rate in bits per picture. From $Q_I$ values of $Q_B$ and $Q_P$ may be computed.

Finally the target rate R(n) for the picture n is computed through $$\text{TargetedR}(n) = \alpha_{t(n)} * Q_{t(n)}^{-\beta}(n)$$

where t(n) is the coding type of picture n.

In summary the overlapping window method has the following steps:
1. Initialize: $E(-1) \leftarrow 0$; select values for $\alpha$'s, $\beta$, $\gamma$ and N; $n \leftarrow 0$
2. Before coding picture n
   (a) update $N_I$, $N_B$ and $N_P$
   (b) compute $Q_I$
   (c) compute $Q_B$ or $Q_P$ if needed
   (d) compute the target rate R(n)
3. After coding picture n with a quality factor $Q_{t(n)}$, measure the actual bits generated by picture n
4. Compute $E(n) \leftarrow \text{TargetedR}(n) - \text{ActualR}(n)$
5. Update $\alpha$'s
6. Move the window by one picture, increment n, and go to step 2

Figure 6:
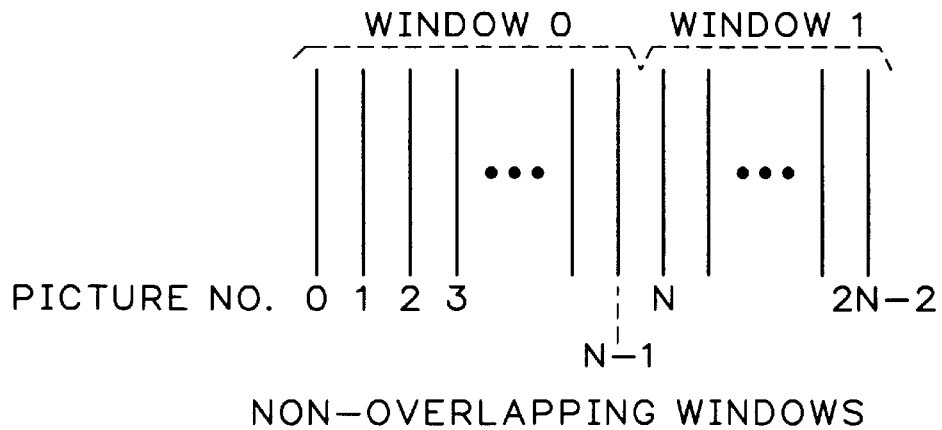
FIG. 6 is an illustrative view of picture grouping for a nonoverlapping window method of determining quality and targeted number of bits according to the present invention.
Figure 7:
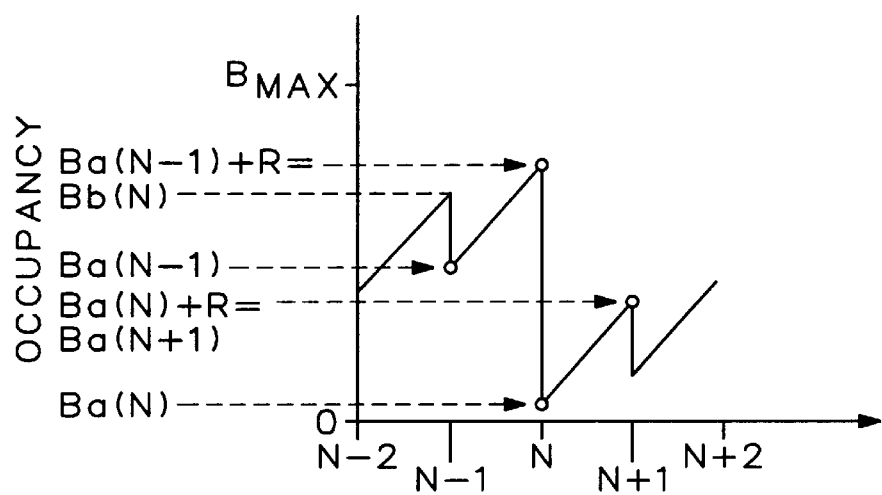
FIG. 7 is a graphic diagram view of buffer occupancy projection for constant bit-rate operation according to the present invention.

In the non-overlapping window method the stream of pictures to be compressed, in coding order rather than display order, is blocked into non-overlapping segments or windows of a preselected size N, as shown in FIG. 6. Each picture belongs to one and only one window. Then pictures 0 through N−1 form the first window, pictures N through 2N−1 form the second window, etc. If WinBits represents the bits available to the remaining pictures in the window and $N_I$, $N_B$ and $N_P$ represent the number of I, B and P pictures remaining in the current window, then for the non-overlapping windows method $$N_I + N_B + N_P \leq N$$

and Q(n) and R(n) are computed as follows:
1. Initialize: WinBits $\leftarrow 0$; select values for $\alpha$'s, $\beta$, $\gamma$ and N; $n \leftarrow 0$
2. Beginning of window: WinBits $\leftarrow$ WinBits$+N*R$
3. Before coding picture n
   (a) update $N_I$, $N_B$ and $N_P$
   (b) compute $Q_I(n) = ((\alpha_I N_I + \alpha_B N_B K_B^{-\beta} + \alpha_P N_P K_P^{-\beta})/\text{WinBits})^{1/\beta}$
   (c) compute $Q_B$ or $Q_P$ if needed
   (d) compute the target rate R(n)
4. After coding picture n with a quality factor $Q_{t(n)}$, measure the actual bits generated by picture n
5. Update WinBits $\leftarrow$ WinBits$-\text{ActualR}(n)$
6. Update $\alpha$'s In MPEG one of the requirements for generating a correctly coded bitstream is that the Video Buffer Verifier (VBV) is not violated. The VBV is a hypothetical decoder, described in ISO/IEC 13818-2 Annex C, which is conceptually connected to the output of an MPEG encoder. The VBV has an input buffer known as the VBV buffer of size $B_{max}$ bits. The target rate R(n) computed in step 2(d) above in the overlapping window method, or in step 3(d) in the non-overlapping window method, may have to be adjusted so as not to overflow or underflow the VBV buffer. The occupancy of the VBV buffer for a constant bit-rate operation of MPEG is shown in FIG. 7 in idealized form. The VBV buffer occupancy B is updated recursively as follows:

If Ba(n−1) is the buffer occupancy right after decoding picture (n−1), the buffer occupancy just before decoding picture n, Bb(n), is given by $$Bb(n) = Ba(n-1) + R$$

where R is the average bits per picture.

The occupancy Ba(n) just after decoding picture n is given by $$Ba(n) = Bb(n) - R(n)$$

where R(n) is the number of bits used for picture n.

The relationship between the number of bits per picture, R(n), and the quality factor Q(n), described above may be used by an MPEG encoder to
1. maintain the constraints imposed by the VBV,
2. keep the VBV buffer occupancy operating point centered, i.e., away from being nearly full or empty,
3. enable VBV buffer occupancy terminal conditions to be achieved, and
4. predict and avoid any potential VBV overflow and underflow condition.

To use this VBV based rate control strategy, the encoder keeps track of the following:
1. the current VBV buffer occupancy at picture n in coding order just before it is removed from the VBV buffer, i.e., Bb(n),
2. the number of pictures of each picture type (I, P and B) remaining in the current window,
3. the target VBV buffer occupancy at the end of a window, this occupancy being the VBV buffer occupancy just before the last picture within the window is removed from the VBV buffer, i.e., $Bb(n+N_I+N_P+N_B)$, and
4. the average number of bits per picture, R, assuming a constant bit rate coding.

The number of available bits to code all pictures remaining in the window, either overlapping or non-overlapping methods, is given by $$\text{WinBits} = Bb(n) + (N_I + N_P + N_B)*R - Bb(n+N_I+N_P+N_B).$$

Using the model described above the quality factor Q(n) for the remainder of the window is estimated by $$Q_I(n) = ((\alpha_I N_I + \alpha_P N_P K_P^{-\beta} + \alpha_B N_B K_B^{-\beta})/\text{WinBits})^{1/\beta}.$$

Then the target bits for each picture type within the window are given by:

$$\text{TargetR}_I = \alpha_I Q_I^{-\beta},$$

$$\text{TargetR}_P = \alpha_P K_P^{-\beta} Q_I^{-\beta}, \text{ and}$$

$$\text{TargetR}_B = \alpha_B K_B^{-\beta} Q_I^{-\beta}.$$

Using these target sizes for each picture type, simulated VBV buffer occupancy trajectory over the window may be computed, i.e., Bb(n) and Ba(n)'s for all remaining pictures of the window are projected. If the trajectory indicates a VBV buffer overflow or underflow or comes close to causing the overflow or underflow, then the window is shortened such that it ends at the point where the overflow or underflow was indicated. A target VBV buffer occupancy is chosen such that no overflow or underflow occurs. With the shortened window $Q_I(n)$ and TargetR's are recomputed. This is shown in FIG. 4 where the quality factor Q(n) is input to a buffer occupancy predictor 32 to project the Bb's and Ba's, which are then input to a VBV comparator 34.

When a satisfactory VBV buffer occupancy trajectory is obtained, then the current picture is coded. When the coding is completed, the actual size of the picture is then used to update the complexity estimates for the current picture type:

$$\alpha_{t(n-1)}(n)=(1-\gamma)*R(n-1)*Q^\beta(n-1)+\gamma*\alpha_{t(n-1)}(n-1).$$

For cases where there is no a priori target VBV buffer occupancy to terminate the window, the size of the window is chosen such that it ends on a "Group of Pictures" boundary. In this case $Bb(n+N_I+N_P+N_B)$ is chosen to be:

$$Bb(n+N_I+N_P+N_B)=0.5*(B_{max}+TargetR_I).$$

Figure 8:
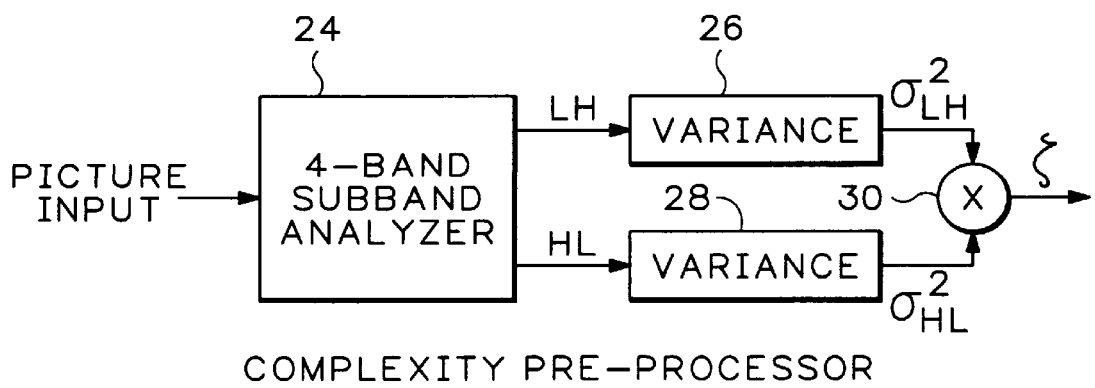
FIG. 8 is a block diagram view of a complexity preprocessor for determining scene cuts according to the present invention.

To compensate for the fact that the at parameter does not adapt in a relatively fast manner at scene changes in the input video, the input video as shown in FIG. 4 also is input to an activity estimator 20. The detected activity is input to comparator 22 to determine whether there has been an abrupt change corresponding to a scene change. The activity estimator 20, as shown in more detail in FIG. 8, measures the activity $\zeta$ of the picture to be coded in determining the complexity of the picture being compressed. A picture (field/frame) to be coded is broken into four bands by a subband analyzer 24. The variance of the energy in the low-high (LH) and high-low (HL) bands is determined by appropriate variance computational circuits 26, 28, and the two variances are input to a multiplier 30. The measure of activity $\zeta$ is calculated as the energy product in low-high and high-low bands:

$$\zeta=\sigma_{LH}^2*\sigma_{HL}^2$$

Any abrupt changes in $\zeta$ from picture to picture indicate a scene change in the video signal. When a scene cut or change is detected, the comparator 22 provides a signal to the processor 14 to flush the old value(s) of $\alpha(n)$ and $\gamma$ is temporarily made equal to 0, i.e., the system is reset. Other forms of scene cut detections are possible and may be used with the rate control mechanism of the present invention.

In general there is no relationship between Bb(0) and Bb(NSEQ), the VBV buffer occupancy at the beginning of consecutive sequences, and they may be arbitrary. For some applications, such as obtaining loopable bitstreams where a single finite size compressed bitstream may be repeatedly fed to an MPEG video decoder without violating the constraints imposed by the VBV, obtaining bitstreams with exact rate requirements, and obtaining splicable bitstreams for editing applications including advertisement insertion, some constraints on these two numbers is applicable. If the video has a total of NSEQ pictures, for the first two mentioned applications the usual requirement is to have Bb(0)=Bb(NSEQ). The term Bb(NSEQ) refers to the decoder buffer occupancy if the transmission continues beyond NSEQ pictures at the constant channel rate of R bits per picture duration.

Given the targets Bb(0) and Bb(NSEQ), the number of bits available for compressing the sequence for a constant bit rate coding may be computed as:

$$SeqBits=NSEQ*R+Bb(0)-Bb(NSEQ).$$

This is used in the following procedure for achieving the target terminal VBV condition in the non-overlapping window method described above. This procedure attempts to avoid violation of the VBV. This procedure starts with an initial guess for $\alpha$'s and preselected constants $\beta$, $K_P$ and $K_B$, and continuously updates the estimated $\alpha$'s. As above, t(n) refers to the coded picture type n. The procedure uses control parameters $\delta Q1$, $\delta Q2$ and $\delta Q3$, described below.

1. Initialize:
   (a) select initial values for $\alpha$'s and $\beta$;
   (b) n←0
   (c) SeqBits=NSEQ*R+Bb(0)−Bb(NSEQ)
2. Beginning of Window:
   (a) compute $N_I SEQ$, $N_B SEQ$ and $N_P SEQ$, the number of I, B and P pictures left in the sequence respectively;
   (b) compute $Q_I = ((\alpha_I*N_I SEQ + \alpha_B*N_B SEQ*K_B^{-\beta} + \alpha_P*N_P SEQ*K_P^{-\beta})/SeqBits)^{1/\beta}$;
   (c) compute the target bits for each picture type for the pictures remaining in the sequence: $TargetR_I = \alpha_I Q_I^{-\beta}$ $TargetR_P = \alpha_P K_P^{-\beta} Q_I^{-\beta}$ $TargetR_B = \alpha_B K_B^{-\beta} Q_I^{-\beta}$;
   (d) compute $N_I$, $N_B$ and $N_P$, the number of I, B and P pictures in the window;
   (e) $WinBits \leftarrow N_I*TargetR_I + N_P*TargetR_P + N_B*TargetR_B$.
3. Before coding picture n
   (a) update $N_I$, $N_B$ and $N_P$;
   (b) compute $Q_I(n) = ((\alpha_I*N_I + \alpha_B*N_B*K_B^{-\beta} + \alpha_P*N_P*K_P^{-\beta})/WinBits)^{1/\beta}$;
   (c) use projection onto convex sets (POCS) to adjust $Q_I(n)$: if $(|Q_I(n)-Q_I(n-1)| <= \delta Q1*Q_I(n-1))$, then $Q_I(n) \rightarrow Q_I(n-1)$, i.e., retain old $Q_I$;
   (d) compute $Q_B$ if t(n)=B; compute $Q_P$ if t(n)=P;
   (e) simulate VBV buffer occupancy trajectory for this picture: if the trajectory indicates a VBV buffer overflow or underflow, then either (1) shorten the window as discussed above, or (2) modify $Q_{t(n)}$ such that overflow or underflow does not happen;
   (f) compute the target rate R(n) for the current picture, called TargetBits.
4. While coding the picture, optionally modulate Q:
   (a) if (remaining bits in picture>0) then localQ←((# of remaining macroblocks*α of current picture) /(remaining bits in picture*# of macroblocks in picture))$^{1/\beta}$*
   spatial modulation,
   else
   localQ←31;
   (b) if (localQ>($\delta Q2$*pictureQ)), then localQ←($\delta Q2$*pictureQ);
   (c) if (localQ<($\delta Q3$*pictureQ)), then local Q←($\delta Q3$*pictureQ).
5. Compute the harmonic mean of the localQ's used within the picture in coding macroblocks of the picture, called $ActualQ_{t(n)}$.
6. If (t(n)=I) then $$Q_I(n)=ActualQ_{t(n)}$$

else if (t(n)=P) then $$Q_I(n)=ActualQ_{t(n)}/K_P$$

else if (t(n)=B) then $$Q_I(n)=ActualQ_{t(n)}/K_B$$

7. Measure the actual bits generated by picture n
8. Update WinBits←WinBits−ActualR(n)
9. Update SeqBits←SeqBits−ActualR(n)
10. Update α's
11. Move to the next picture and repeat above.

Step 2 above assures that the VBV path evolves from Bb(0) towards Bb(NSEQ) in a smooth fashion.

Figure 9:
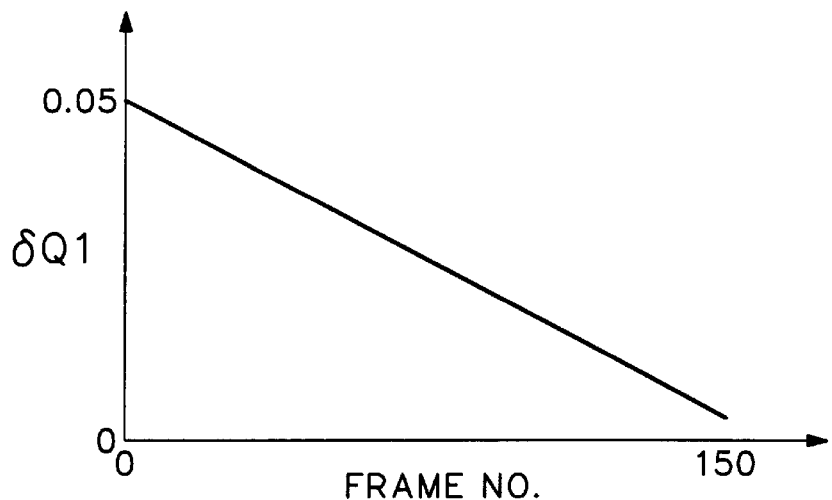
FIGS. 9, 10 and 11 are graphic views of constants $\delta Q1$, $\delta Q2$ and $\delta Q3$ according to the present invention.

Step 3c above makes the quality factor change smoothly, be unaffected by small variations in the picture complexity, and adjust quickly in cases of scene changes. The term δQ1 in step 3c is a parameter that controls the quality factor variation from picture to picture. This factor should be large at the beginning of the sequence so that the quality does not fluctuate unnecessarily, and be small at the end of the sequence so that the exact bit rate targets may be achieved. The values of δQ1 in one particular implementation are shown in FIG. 9.

Figure 10:
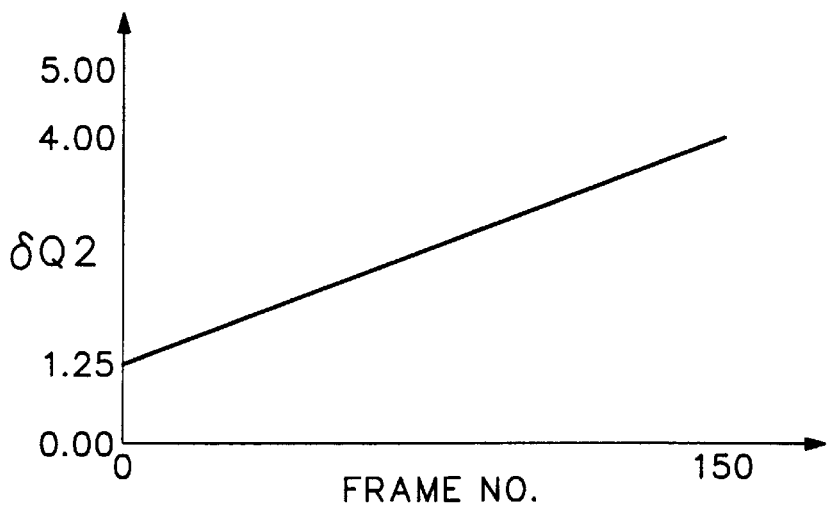
Figure 11:
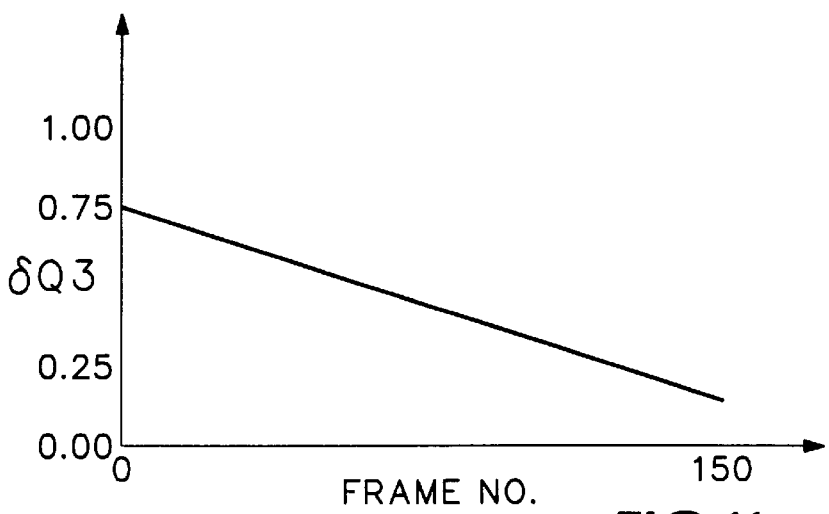

Step 4 is optional, and is similar to the Test Model. Q is modulated around the Q determined in step 3 above so that the picture target rates are achieved and/or perform spatial masking. The parameters δQ2 and δQ3 constrain the quality variation within a picture. Again only smaller variations should be allowed at the beginning of the sequence, and larger variations may be permitted at the end of the sequence. The values of δQ2 and δQ3 in one particular implementation are shown in FIGS. 10 and 11 respectively.

To update the α's in step 10 ActualR(n) is the actual bits generated by coding the picture with an average (harmonic mean) quality factor ActualQ$_{t(n)}$. Let α$_I$, α$_P$ and α$_B$ be the current estimates of α's for the three picture types. First the α of the current picture type is updated as follows:

Method 1.
1. Tmpα$_{t(n)}$←ActualR(n)*ActualQ$_{t(n)}^\beta$
2. if (((Tmpα$_{t(n)}$−α$_{t(n)}$)/Tmpα$_{t(n)}$)>δα) then α$_{t(n)}$←(1.0−δα)*Tmpα$_{t(n)}$ else if (((Tmpα$_{t(n)}$−α$_{t(n)}$)/Tmpα$_{t(n)}$)<−δα) then α$_{t(n)}$←(1.0+δα)*Tmpα$_{t(n)}$ else
   retain the old value of α$_{t(n)}$
   endif The parameter δα controls how much deviation in α is expected from picture to picture without any scene change. This type of projection makes the update immune to minor variations in the picture complexity due to noise, while making it quick to adjust in cases of scene changes. The particular value for one implementation of the rate controller is δα=0.05.

Method 2.
In this method additional state information is maintained from picture to picture. A 2×1 vector per picture type denoted by θ is initialized as:

θ$_I$=[1, (α$_I$−RQ$_I^\beta$)]

θ$_P$=[1, (α$_P$−RQ$_P^\beta$)]

θ$_B$=[1, (α$_B$−RQ$_B^\beta$)]

In the absence of a-priori information a 2×2 matrix per picture type denoted by P is initialized as:

P$_I$=[1, 0; 0, 1]

P$_P$=[1, 0; 0, 1]

P$_B$=[1, 0; 0, 1]

After coding a picture the following steps are followed for the current picture type:
1. φ=[Prior Encoder Fullness, Q$^{-\beta}$]
2. θ$_{t(n)}$=θ$_{t(n)}$+(1.0φ$^T$P$_{t(n)}$φ)(Current Encoder Fullness−φ$^T$θ)P$_{t(n)}$φ
3. P$_{t(n)}$=P$_{t(n)}$−(1.0/φ$^T$P$_{t(n)}$φ)P$_{t(n)}$φφ$^T$P$_{t(n)}$
4. θ$_{t(n)}$=θ$_{t(n)}$+((1−θ(1))/P$_{t(n)}$(1,1))P$_{t(n)}$e$_1$
   where e$_1$=[1, 0] and P$_{t(n)}$(1,1) is the first element of first row in P$_{t(n)}$
5. α$_{t(n)}$=θ$_{t(n)}$(2)+ActualQ$_{t(n)}^\beta$R
   where θ$_{t(n)}$(2) is the second element of θ$_{t(n)}$.

where "T" denotes the matrix or vector transpose function.

Figure 12:
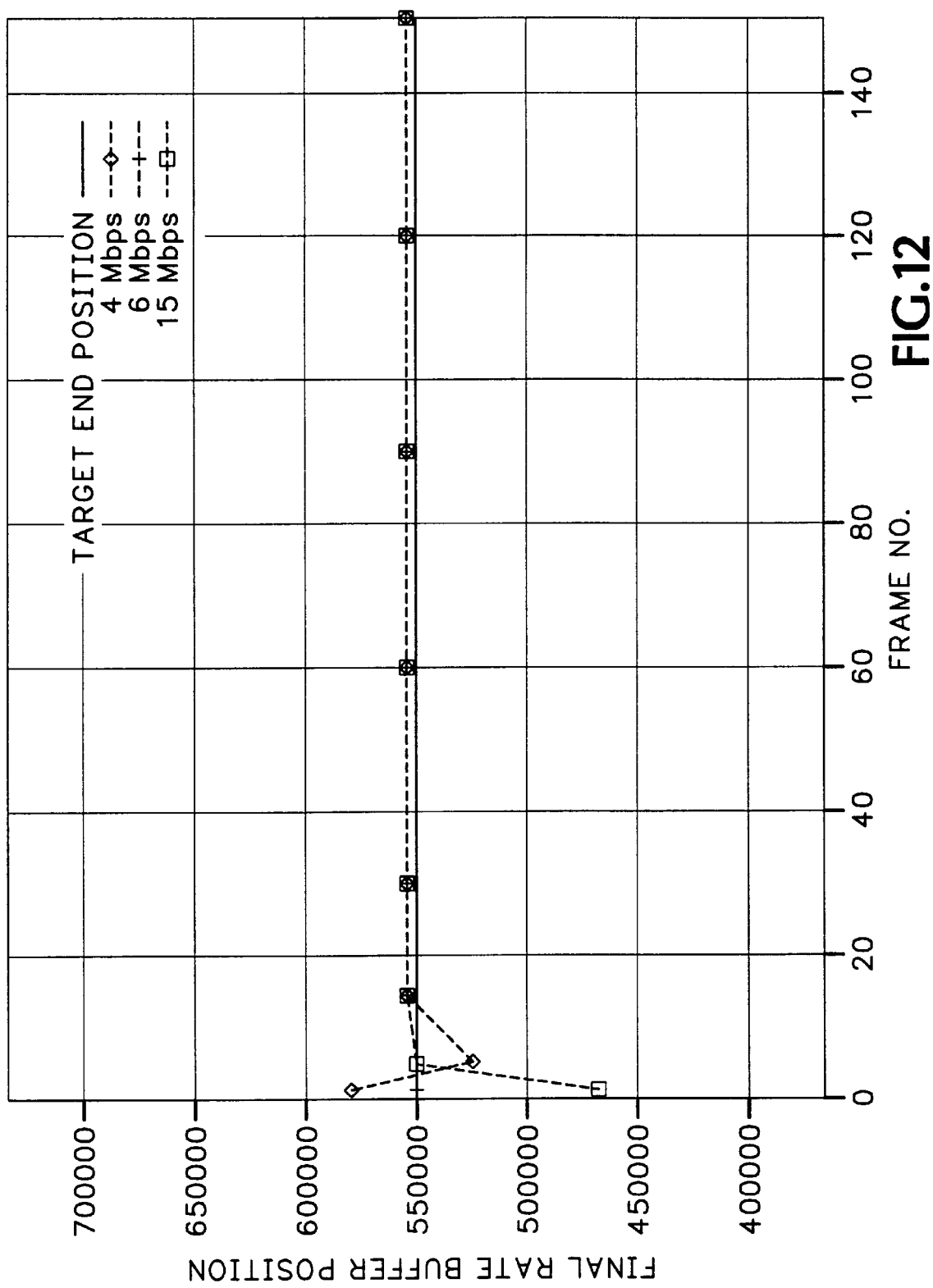
FIG. 12 is a graphic view of the results the performance of the rate control process according to the present invention.

After updating the α of the current picture type using either of the two methods described above, the other two α's are updated as follows. If the current picture type is I, then based on the just updated α$_I$, α$_P$ and α$_B$ are updated through:
1. if (α$_P$<(L$_{PI}$.α$_I$)) then α$_P$=L$_{PI}$.α$_I$
2. if (α$_B$<(L$_{BI}$.α$_I$)) then α$_B$=L$_{BI}$.α$_I$ Similarly if the current picture type is P, then based on the just updated α$_P$, α$_I$ and α$_B$ are updated through:
1. if (α$_I$<(L$_{IP}$.α$_P$)) then α$_I$=L$_{IP}$.α$_P$
2. if (α$_B$<(L$_{BP}$.α$_P$)) then α$_B$=L$_{BP}$.α$_P$, and if the current picture type is B, then based on the just updated α$_B$, α$_I$ and α$_P$ are updated through:
1. if (α$_I$<(L$_{IB}$.α$_B$)) then α$_I$=L$_{IB}$.α$_B$
2. if (α$_P$<(L$_{PB}$.α$_B$)) then α$_P$=L$_{PB}$.α$_B$ These projections ensure that in the case of a scene cut in the input video, all the α's are updated. The constants L$_{PI}$, L$_{BI}$, L$_{IP}$, L$_{BP}$, L$_{IB}$ and L$_{PB}$ are predetermined, such as 0.2, 0.1, 1.11, 0.11, 2.0 and 1.8 respectively. FIG. 12 shows the performance of one implementation of the above described rate control process for a sequence coded at different bit rates and multiple NSEQ according to Method 1 for updating α's.

Thus the present invention provides a rate control mechanism for video compression that uses a special relationship model between the quality factor and the average bits generated using an indication of complexity of the block being processed.

We claim:

1. A bit rate controller for a moving image data compression encoder comprising:
   means in response to an actual bit rate for a prior coded block of the moving image data for generating a complexity factor as a function of a prior complexity factor and a prior quality factor for the prior coded block;
   means for computing a quality factor for a present block of the moving image data compression decoder as a function of the complexity factor and a target bit rate for the present block; and
   means for controlling a virtual buffer occupancy so that a target occupancy value is achieved at the end of a specified sequence of images encompassed by the moving image data.

2. A bit rate controller as recited in claim 1 wherein the controlling means comprises:
   means for initializing parameters including the complexity factor;
   means for determining a number of bits for a window that includes a subset of the specified sequence based on the remaining pictures in the specified sequence and the target occupancy value;
   means for computing a target rate for a current picture within the window;

means for measuring the actual bits generated for the current picture;

means for updating the parameters including the complexity factor; and means for moving to a next picture in the window and repeating the computing, measuring and updating means until all the pictures in the window are processed.

3. The bit rate controller as recited in claim 2 wherein the complexity factor updating means comprises means for detecting whether a scene change has occurred from one picture in the specified sequence to the next based upon an expected deviation of the complexity factor.

4. The bit rate controller as recited in claim 2 wherein the complexity factor updating means comprises means for maintaining state information from one picture to the next in the specified sequence using vector representations in order to adjust the complexity factor when a scene change is detected.

5. A method of compressing moving image data comprising the steps of:

initializing a bit rate controller by selecting a complexity value and a size for a processing window in terms of a given number of blocks of the moving image data;

determining a number of bits for the window as a function of the size of the processing window and an average bit rate;

computing by the bit rate controller a quality factor for a block of the moving image data as a function of the complexity value, a remaining size of the processing window and the number of bits for the processing window, and computing a target bit rate for the block of the moving image data as a function of the quality factor and the complexity value;

coding the block of the moving image data in an encoder using the quality factor;

updating the number of bits in the processing window as a function of an actual bit rate from the encoder for the block of the moving image data, the size of the processing window to determine the remaining size, and the complexity value for a next block of the moving image data within the processing window as a function of the quality factor and complexity value for the block of the moving image data;

repeating the determining, computing, coding and updating steps for each block within the processing window;

moving the processing window by the size of the processing window and repeating the above steps for a next group of blocks of the moving image data; and controlling a virtual buffer occupancy so that a target occupancy value is achieved at the end of a specified sequence of images encompassed by the moving image data prior to the initializing step.

* * * * *